UNITED STATES PATENT OFFICE.

YORK SCHWARTZ, OF HANOVER, GERMANY, ASSIGNOR TO SYNOLOIDS LIMITED, OF LONDON, ENGLAND.

PHOTOGRAPHIC EMULSION.

13,144. Specification of Reissued Letters Patent. Reissued Aug. 16, 1910.

No Drawing. Original No. 710,019, dated September 30, 1902, Serial No. 111,227. Application for reissue filed January 27, 1910. Serial No. 540,472.

*To all whom it may concern:*

Be it known that I, YORK SCHWARTZ, a subject of the King of Prussia, German Emperor, and a resident of 3 Edenstrasse, Hanover, in the Province of Hanover, German Empire, have invented a new and Improved Photographic Emulsion, of which the following is an exact specification.

It has been tried to use silver phosphate for manufacturing photographic emulsions without using any halogenous silver-compounds, but these trials have not been very successful as in the photographs manufactured by means of such emulsions the gradations between the intense lights and the intense shadows are too small, so that the photographs are not brilliant enough, that is to say, they are not sufficiently rich in contrasts. I do away with this disadvantage by my new invention which consists in emulsifying the silver phosphate in gelatin-solutions in the presence of silver chlorate and silver citrate. Instead of silver citrate, silver tartrate can be used.

An excellent emulsion is obtained by mixing the following solutions: (A.) 15.0 grams gelatin dissolved in eighty cubic centimeters distilled water. (B.) 1.9 grams di-sodium phosphate ($Na_2HPO_4+12\ H_2O$) 0.6 grams potassium chlorate 1.7 grams neutral potassium citrate ($K_3C_6H_5O_7+H_2O$) 0.4 grams citric acid, dissolved in forty cubic centimeters distilled water. (C.) 5.2 grams crystallized silver nitrate dissolved in ten cubic centimeters distilled water. The mixing of this solution is effected in the following way: The solution B is added to the solution A, then ten cubic centimeters of distilled water are added, whereupon solution C is added in small quantities to the mixture of the solutions A and B, at the same time thoroughly shaking the mixture.

The above proportions are such that in the ready emulsion no free silver nitrate is contained.

The photographic papers prepared with this emulsion show the following excellent qualities: They are extremely durable and do not show any changes even after several months when kept in an open envelop without surrounding the same with a watertight material. The coating is so even and hard that even in summer time the use of hardening substances is unnecessary. They give excellently graded and permanent copies with beautiful and brilliant tones without being washed before toning in the well-known gold- and platinum- baths. The finished pictures are very strong and resist mechanical effects as well as the effects of the atmosphere extremely well. Besides these advantages it is a further considerable advantage that it is not necessary to expose these papers under the negative up to the full power of the picture. It is only necessary to expose the same according to the density of the negative from twenty to thirty seconds to the action of the day-light, in order to obtain a slightly visible picture which in dull day-light or in the usual lamp-light can be developed in a very simple manner to any desired power.

The developer consists for instance of a solution of: 0.16 grams of potassium bichromate and 0.1 grams of potassium bromid in five hundred cubic centimeters of distilled water, to each fifty cubic centimeters of which solution before using the same thirty drops of a solution of two per cent. of gallic acid in alcohol are added.

After washing the so developed pictures they are treated in the same manner as the pictures which were perfectly copied under the negative.

The sensitiveness to the action of the light of the paper is so great that the light of a magnesium-strip of 2.5 centimeters length and 3 millimeters breadth which is burned at a distance of 30 centimeters from the copying frame is sufficient for producing a picture which can be developed to the full extent.

It will be clear that the emulsions may be used for manufacturing any kind of sensitive films or surfaces for photographic purposes.

Having thus fully described the nature of this invention, what I desire to secure by Letters Patent of the United States, is:—

A photographic emulsion, containing an emulsifying agent, silver-phosphate, silver chlorate, and a silver salt of an organic acid, substantially as described.

In testimony whereof I have signed my name to this specification in the presence of the subscribing witnesses.

YORK SCHWARTZ.

Witnesses:
LOUISE KNOKE,
LEONORE RASCH,
C. C. STEVENSON.